(12) United States Patent
James

(10) Patent No.: US 6,938,806 B2
(45) Date of Patent: Sep. 6, 2005

(54) GOLF CLUB RACK FOR MOTORCYCLE

(76) Inventor: Cameron P. James, 110 Lafayette SE, Apt. 1, Grand Rapids, MI (US) 49503

( * ) Notice: Subject to any disclaimer, the term of this patent is extended or adjusted under 35 U.S.C. 154(b) by 0 days.

(21) Appl. No.: 10/618,195

(22) Filed: Jul. 11, 2003

(65) Prior Publication Data

US 2004/0108347 A1 Jun. 10, 2004

Related U.S. Application Data

(60) Provisional application No. 60/395,105, filed on Jul. 11, 2002.

(51) Int. Cl.[7] ............................................. B62J 11/00
(52) U.S. Cl. ...................... 224/413; 224/431; 224/451; 224/452; 224/454; 224/423
(58) Field of Search ................................ 224/413, 431, 224/438, 430, 451, 452, 454, 520, 498, 526, 315, 423

(56) References Cited

U.S. PATENT DOCUMENTS

| | | | |
|---|---|---|---|
| 597,318 A | | 1/1898 | Jenks |
| 1,475,605 A | * | 11/1923 | Smith ...................... 224/42.39 |
| 1,683,169 A | | 9/1928 | DeNoya |
| 3,087,661 A | * | 4/1963 | Glenny ........................ 224/429 |
| 3,286,891 A | * | 11/1966 | Jones, Jr. ..................... 224/455 |
| 3,938,719 A | * | 2/1976 | Carlton ........................ 224/419 |
| 4,081,117 A | * | 3/1978 | Crane .......................... 224/441 |
| 4,387,836 A | * | 6/1983 | Laesch ....................... 224/412 |
| 4,393,986 A | | 7/1983 | Sirey |
| 5,207,361 A | | 5/1993 | Slifka |
| 5,340,003 A | * | 8/1994 | Wilson ....................... 224/415 |
| 5,664,715 A | * | 9/1997 | Gogan et al. ............... 224/413 |
| 5,727,642 A | * | 3/1998 | Abbott ....................... 180/65.1 |
| 5,762,249 A | * | 6/1998 | Hann .......................... 224/430 |
| D409,557 S | | 5/1999 | Armour |
| D437,578 S | | 2/2001 | Stannard-Warne |
| D439,215 S | | 3/2001 | Kahmann |
| 6,293,450 B1 | * | 9/2001 | Aron ........................... 224/430 |
| 6,401,998 B1 | * | 6/2002 | Puluso ........................ 224/422 |

\* cited by examiner

Primary Examiner—T. Mai
(74) Attorney, Agent, or Firm—Varnum, Riddering, Schmidt & Howlett LLP

(57) ABSTRACT

A golf club rack for a motorcycle comprises a mounting plate that is removably mounted on existing holes in the side of a motorcycle fender and a cradle that is removably attachable to the mounting plate. The cradle has a bottom and upwardly extending sides that hold the golf clubs upright, preferably inclined inwardly, at the side of the motorcycle. The cradle preferably is attached to the mounting plate by a releasable mounting mechanism held in place by a single threaded fastener. Desirably, the mounting mechanism includes a mounting bracket on the cradle that is bolted on a mounting block on the mounting plate.

11 Claims, 10 Drawing Sheets

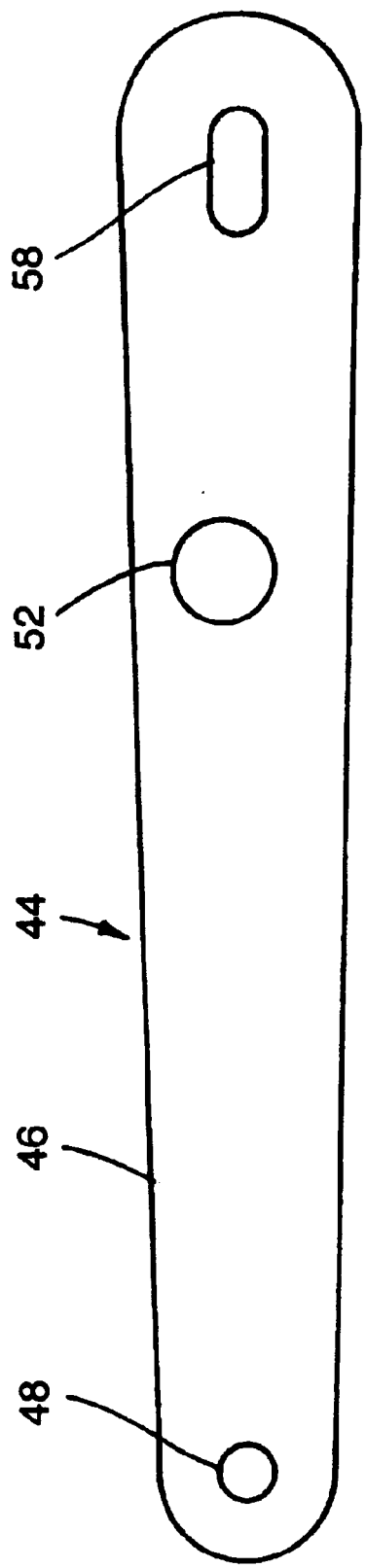
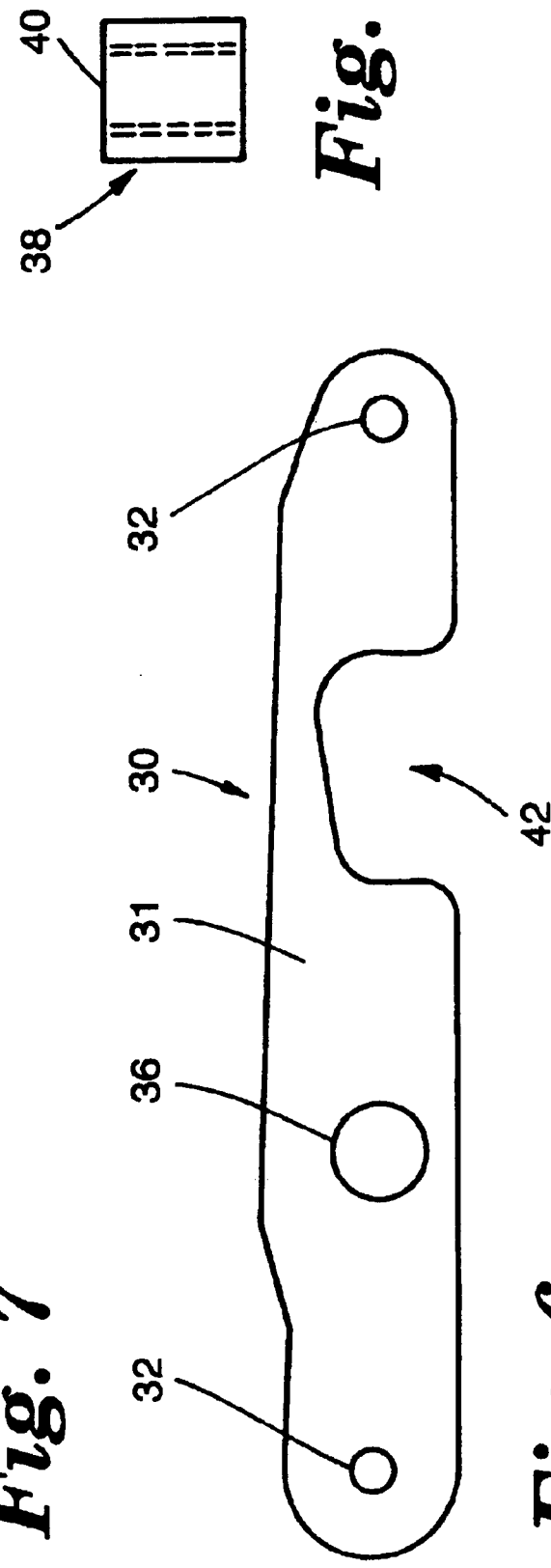
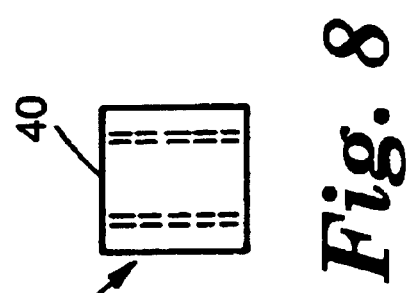

GOLF CLUB RACK FOR MOTORCYCLE

CROSS-REFERENCES TO RELATED APPLICATIONS

This application is based on and claims the priority date of co-pending provisional patent application Ser. No. 60/395,105, filed Jul. 11, 2002.

BACKGROUND OF THE INVENTION

While motorcycles are fun to ride, they sometimes present problems when it is necessary to transport cargo. Saddle bags and trailers exist for carrying most things, but elongated cargo, such as golf clubs or other long things are more difficult to transport. The problem is compounded when it is important not to drill holes in or otherwise permanently modify the motorcycle, and when it is desired to be able to quickly and simply mount and dismount the carrier.

SUMMARY OF THE INVENTION

The present invention relates to a rack or attachment mechanism for carrying elongated cargo such as golf clubs on a motorcycle. A preferred embodiment of the invention is specifically configured to work with existing Harley Davidson motorcycles. The invention includes a U-shaped cradle that mounts to a unique bracket that may be attached to pre-existing fender holes in a Harley Davidson motorcycle. A single bolt extends through an opening in a cradle mounting plate to lock the cradle to the mounting bracket on the motorcycle. The cradle itself may be removed by removing the single bolt, with the non-obtrusive mounting bracket remaining in place. An important advantage of the present invention is the adaptation thereof to the existing Harley Davidson motorcycle framing system. The bracket of the present invention uniquely allows a "reversible" modification to the Harley Davidson motorcycle, such that the entire system may be removed from the motorcycle and the motorcycle restored to its original condition at the desire of the owner, without leaving any visible modifications to the original motorcycle. This is particularly desirable from the standpoint of a motorcycle such as a Harley Davidson, which has increased value in its original, unmodified state.

These and other features, objects, and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 6 is a side elevational view of the mounting bracket for the Sportster and Dyna Series of Harley Davidson motorcycles.

FIG. 7 is a side elevational view of the mounting bracket for the Softail model of Harley Davidson motorcycles.

FIG. 8 is a side elevational view of the mounting block employed with the mounting bracket of the present invention.

DETAILED DESCRIPTION OF THE INVENTION

Figure 1:
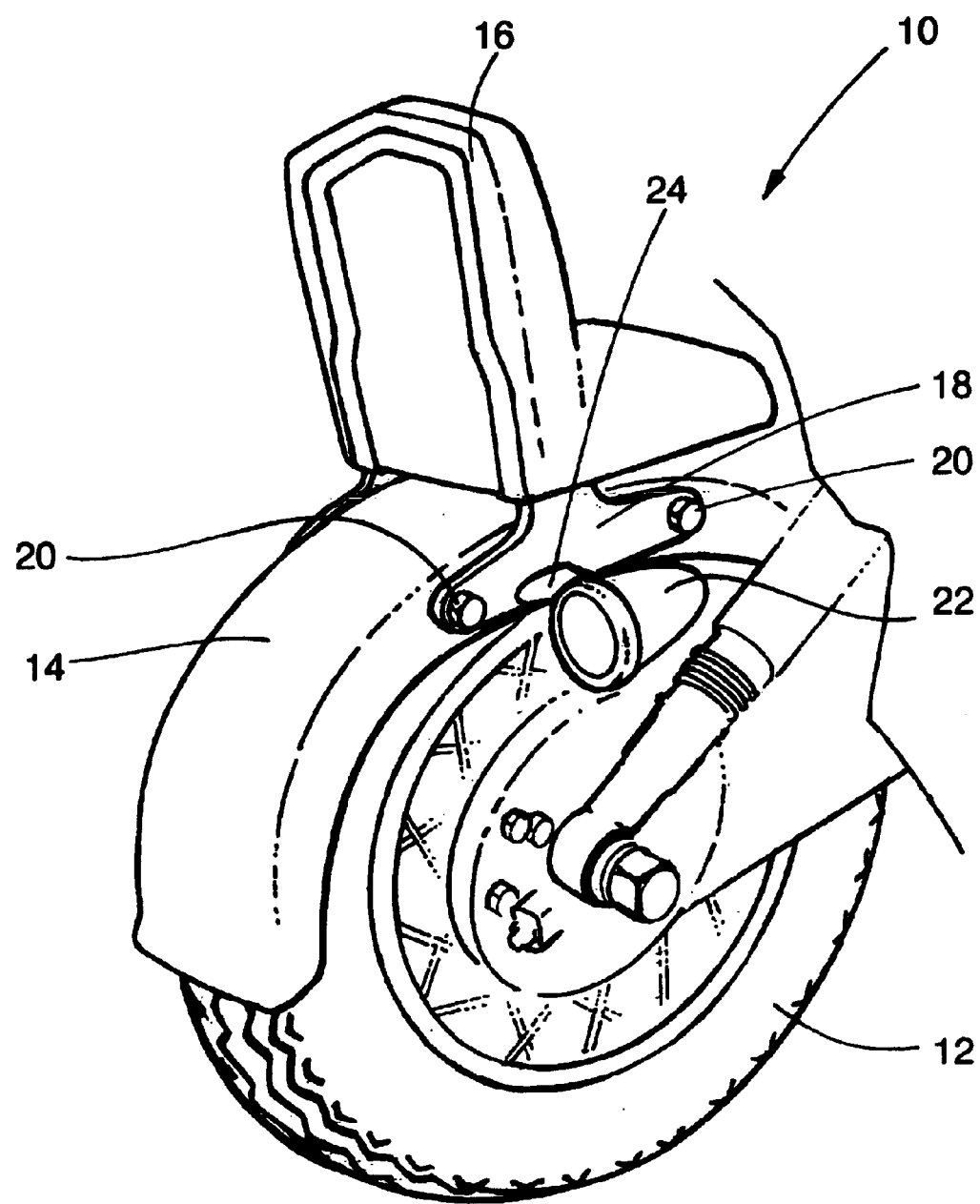
FIG. 1 is a schematic perspective view of the rear portion of a motorcycle, such as a Harley Davidson Sportser or Dyna Glide, with the Harley Davidson Softail motorcycle not having the tail light extending outwardly from the side of the fender between the mounting bolts.

Referring to the drawings, a motorcycle 10 includes a rear wheel 12, a rear fender 14, and a seat 16. The figure illustrates a motorcycle construction that is roughly comparable to the construction of a Harley Davidson Sportster or Dyna Series motorcycle. A bracket 18 is mounted by holes 20 through the side of fender 14. A tail light 22 mounted on an arm 24 extends outwardly from the side of the motorcycle. A Harley Davidson Softail motorcycle is similar in construction, but does not have the tail light and arm extending outwardly from the side of the motorcycle in between holes 20.

Figure 3:
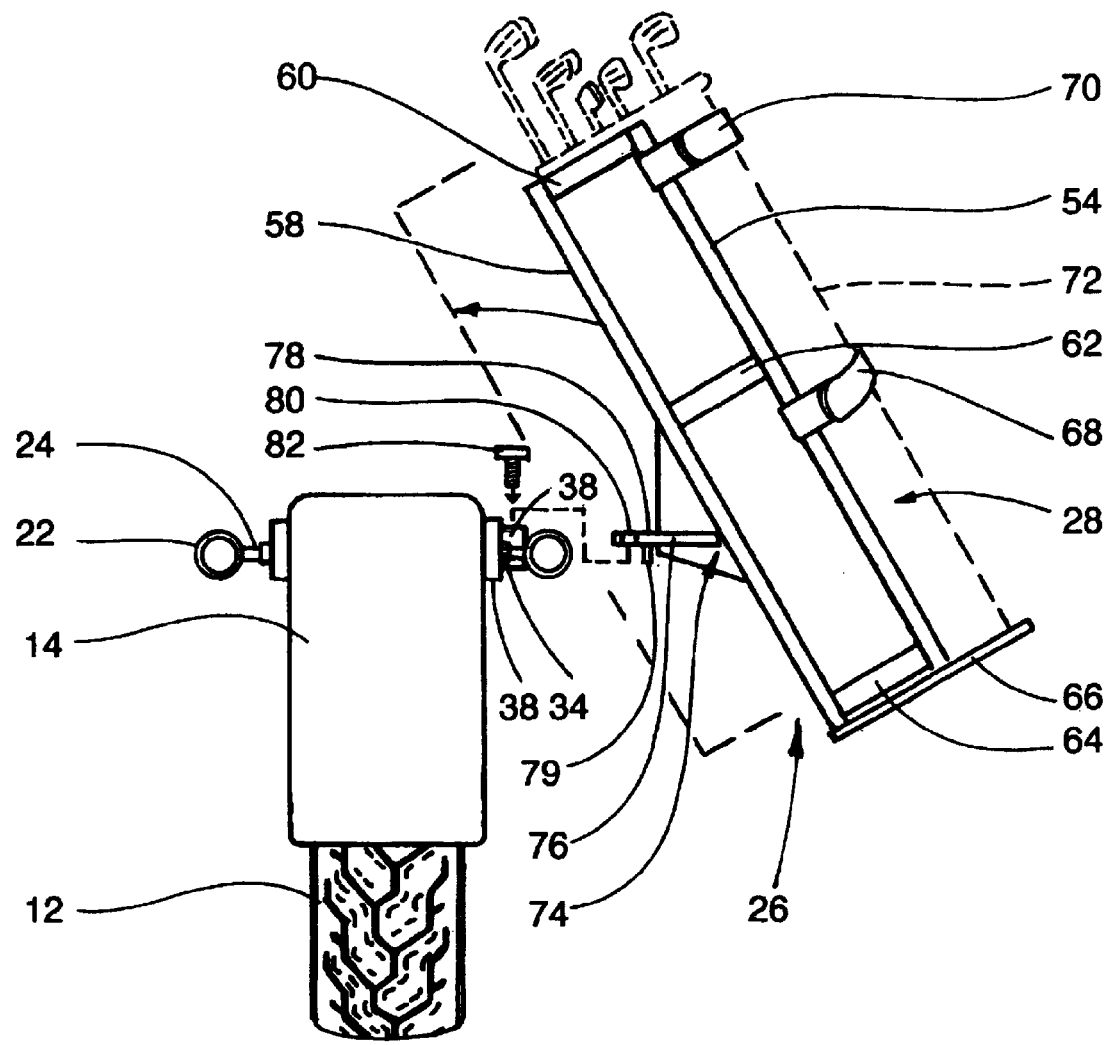
FIG. 3 is a rear elevational view of the motorcycle of FIG. 1, showing the manner in which the golf club rack of the present invention is mounted on the fender.
Figure 4:
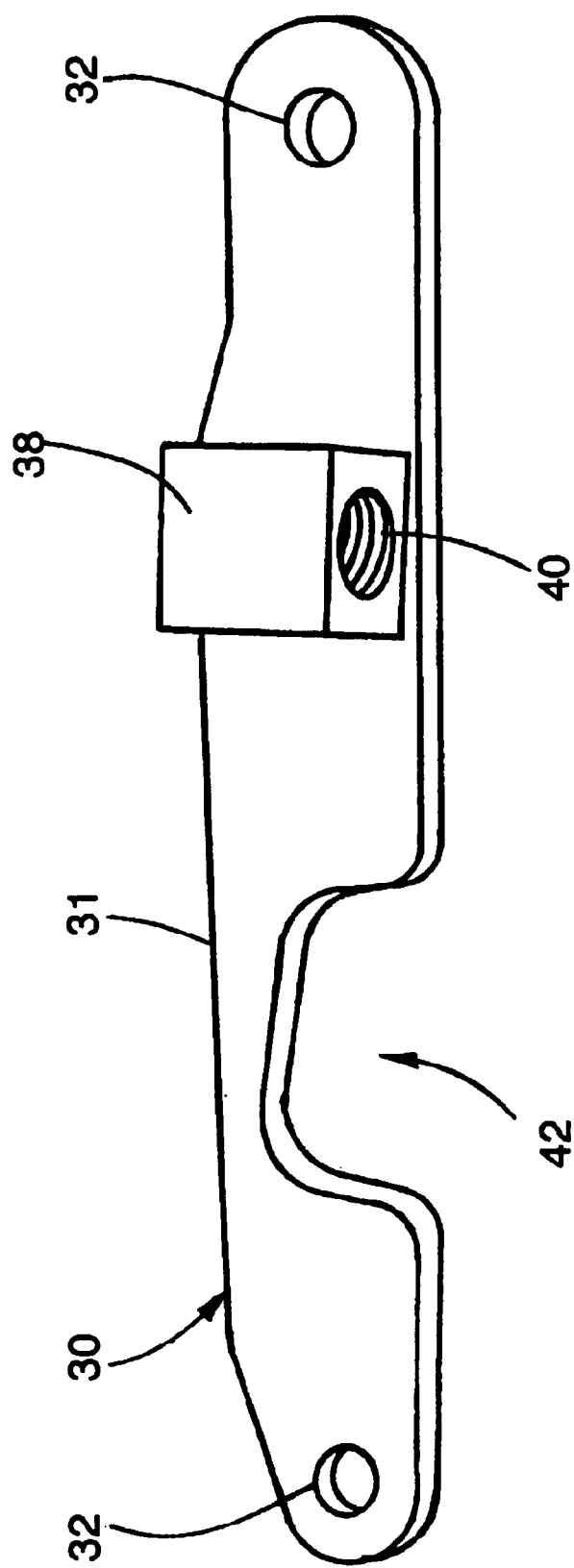
FIG. 4 is a perspective view of a mounting bracket for the Sportster or Dyna Series motorcycles of Harley Davidson.
Figure 5:
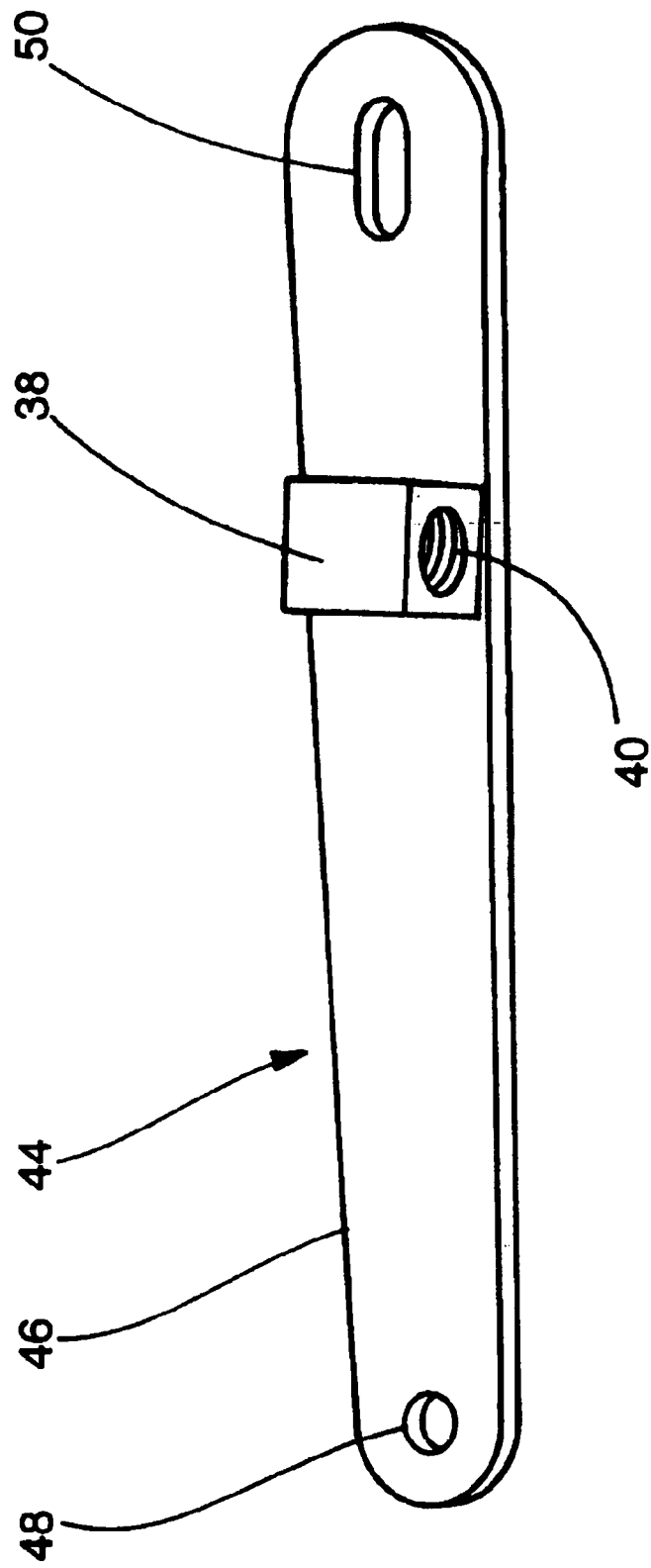
FIG. 5 is a perspective view of a mounting bracket for the Softail models of Harley Davidson motorcycles.
Figure 9:
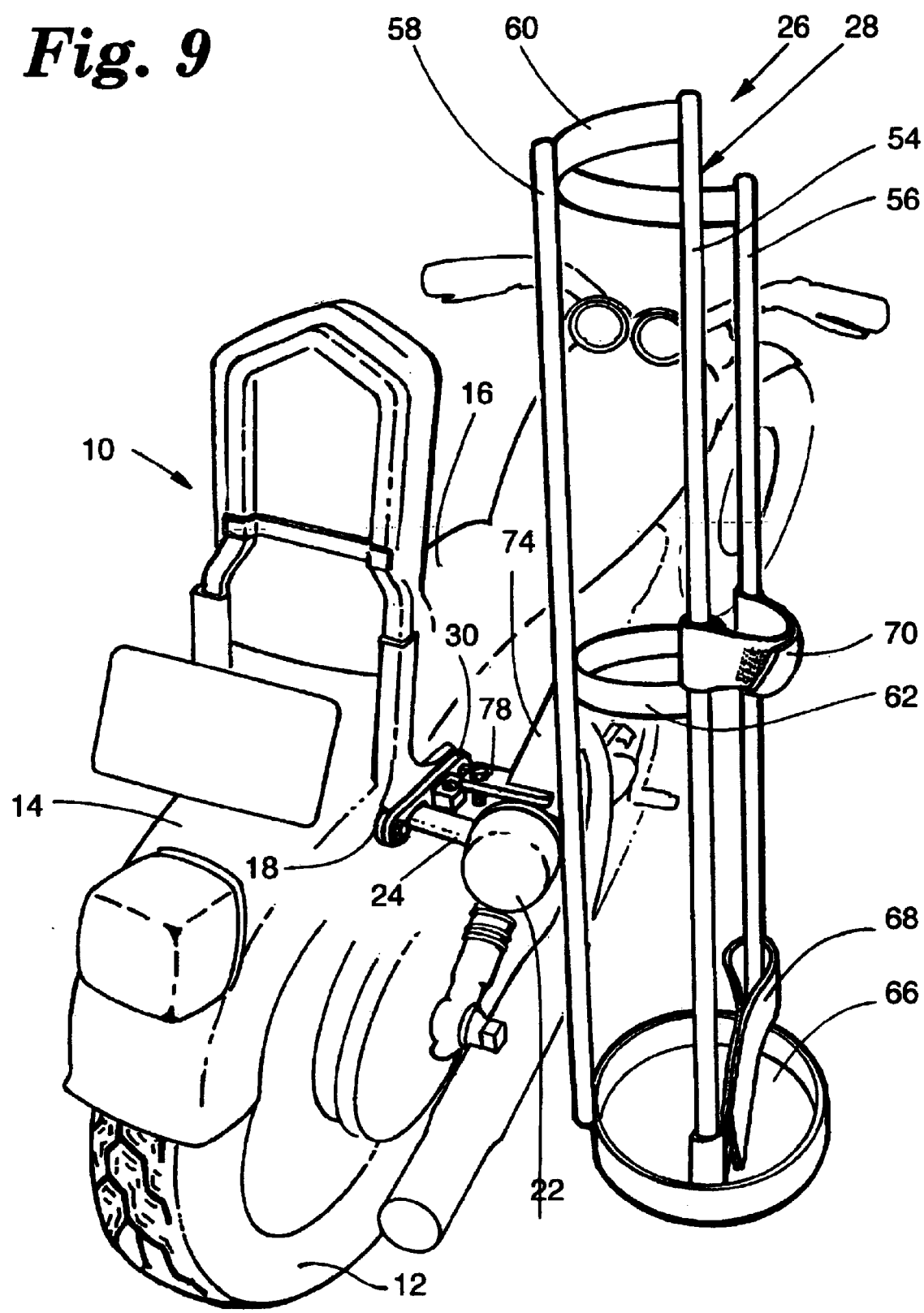
FIG. 9 is a perspective view showing the rack of the present invention in mounting position with respect to a motorcycle.
Figure 10:
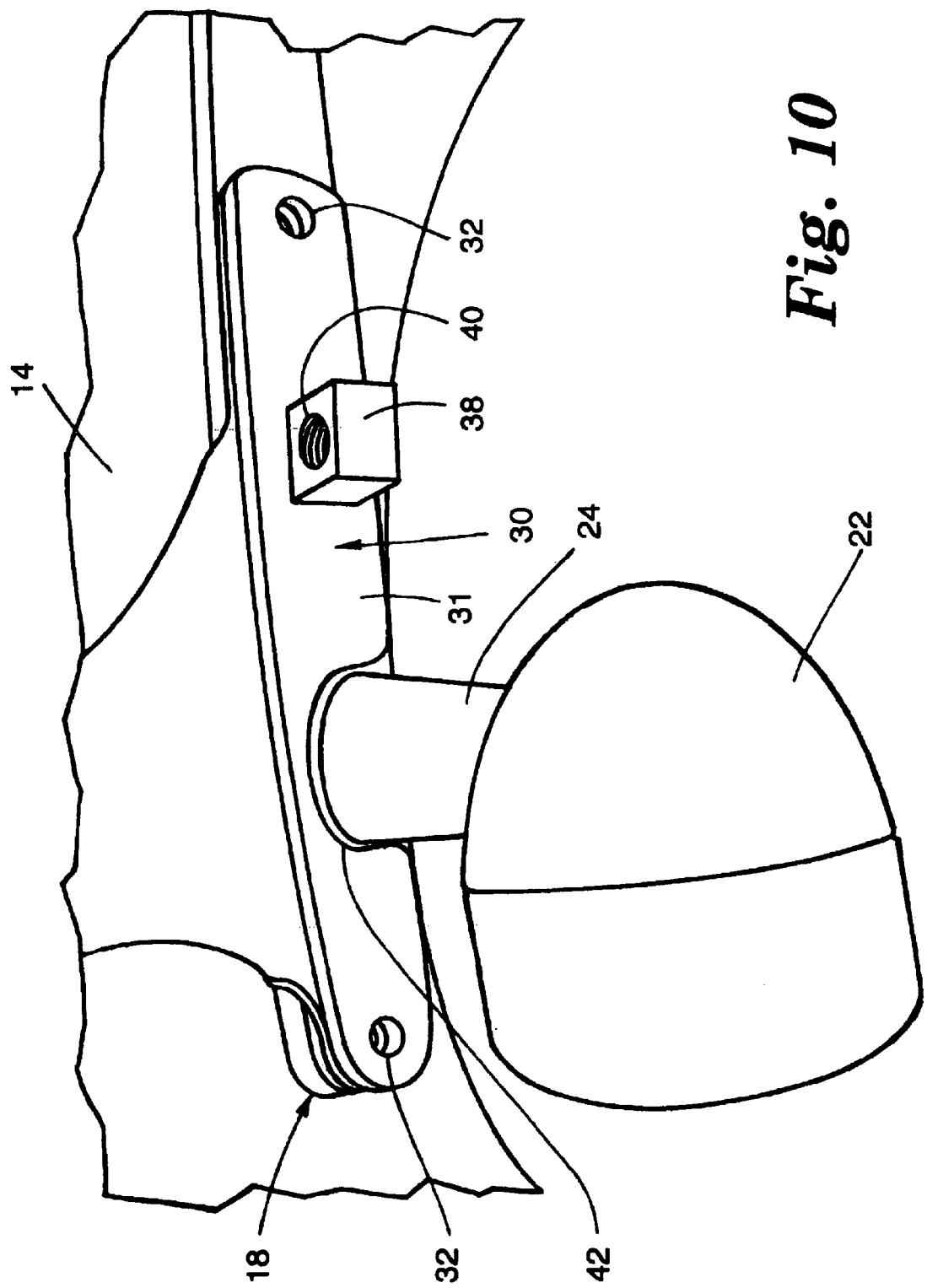
FIG. 10 is a perspective view showing the mounting bracket of the present invention mounted on a Sportster or Dyna Series Harley Davidson motorcycle.

A rack 26 constructed in accordance with the present invention comprises a cradle 28 that is mountable by a unique mounting bracket 30 to the existing holes 20 in the fender of the motorcycle by a single removable mounting bolt 82 (FIG. 3).

Figure 2:
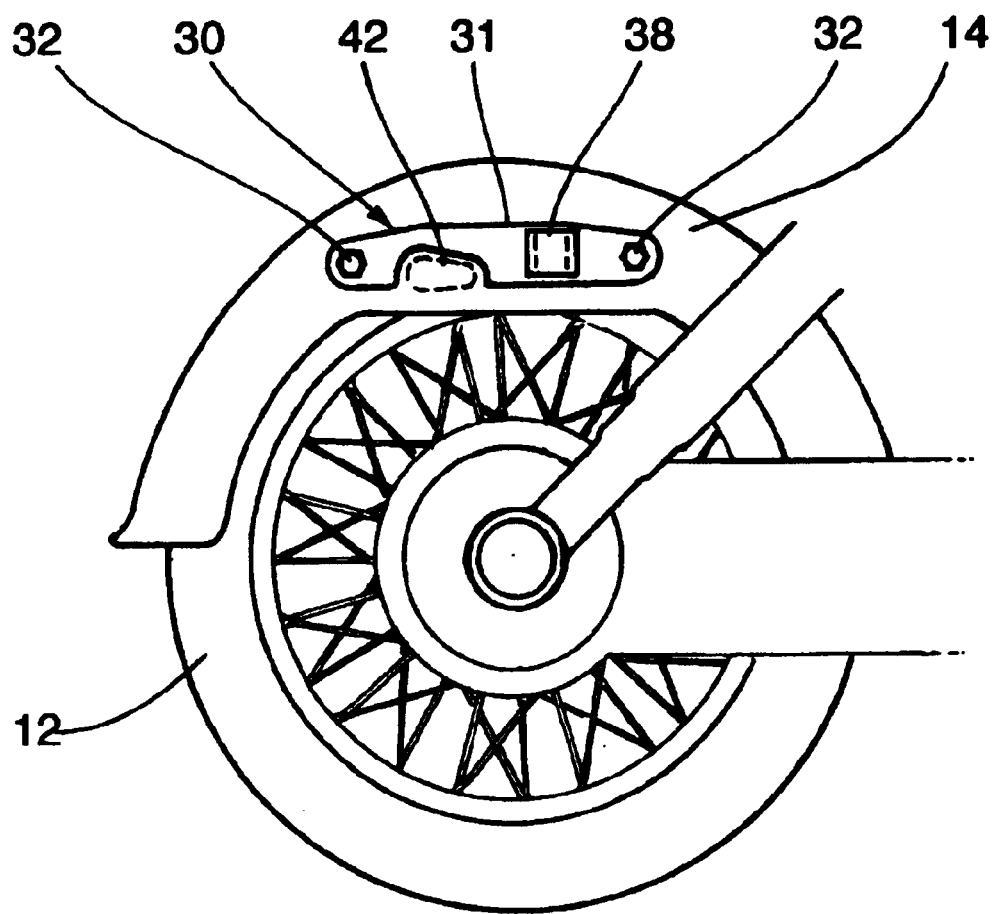
FIG. 2 is a schematic side view of the motorcycle fender of FIG. 1, showing the mounting bracket installed in existing holes in the fender, with the tail light being removed for illustration purposes.
Figure 11:
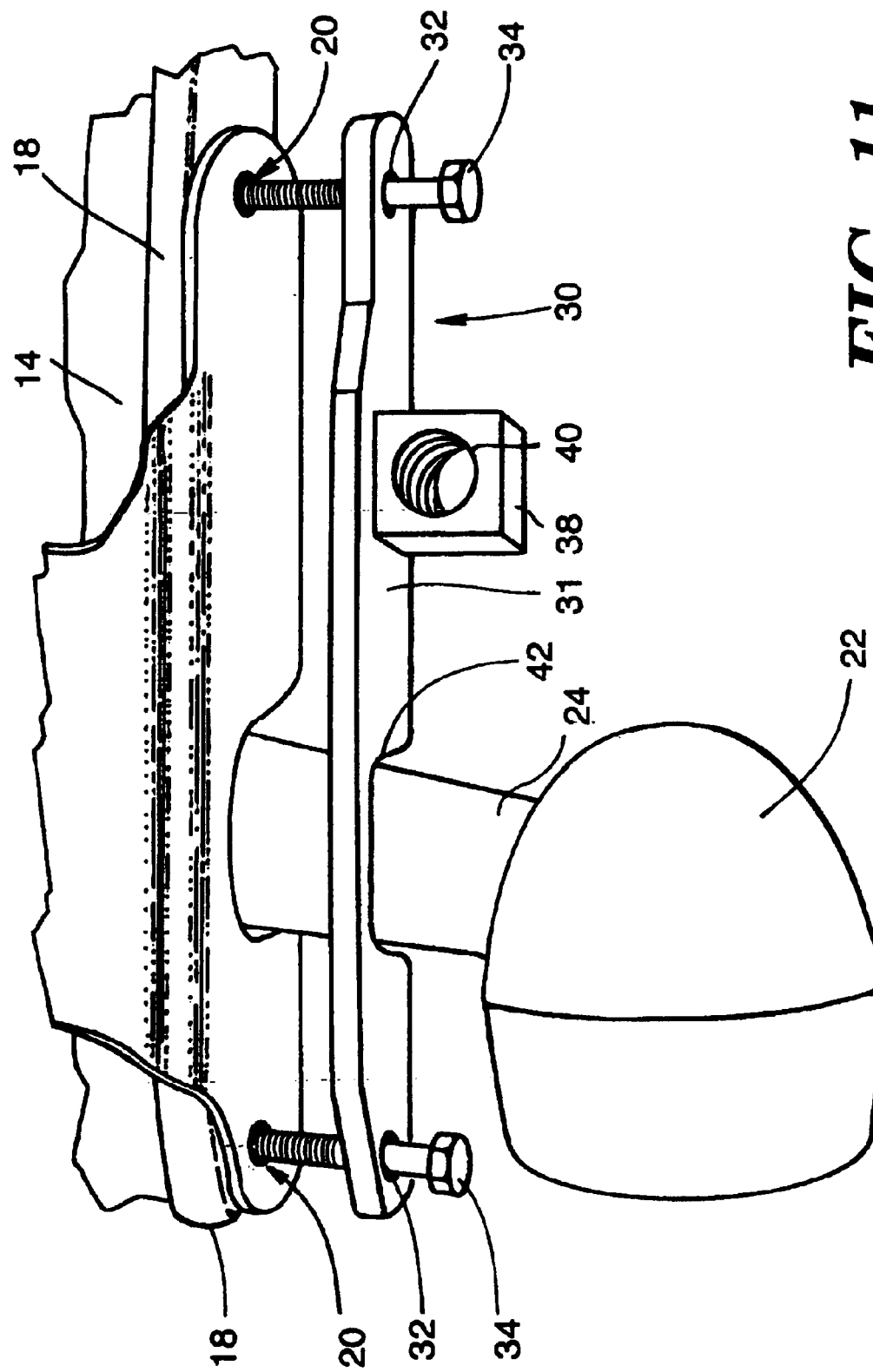
FIG. 11 is a plan view of the mounting bracket of FIG. 10, showing the manner in which the bracket is bolted to the fenders of a motorcycle.
Figure 12:
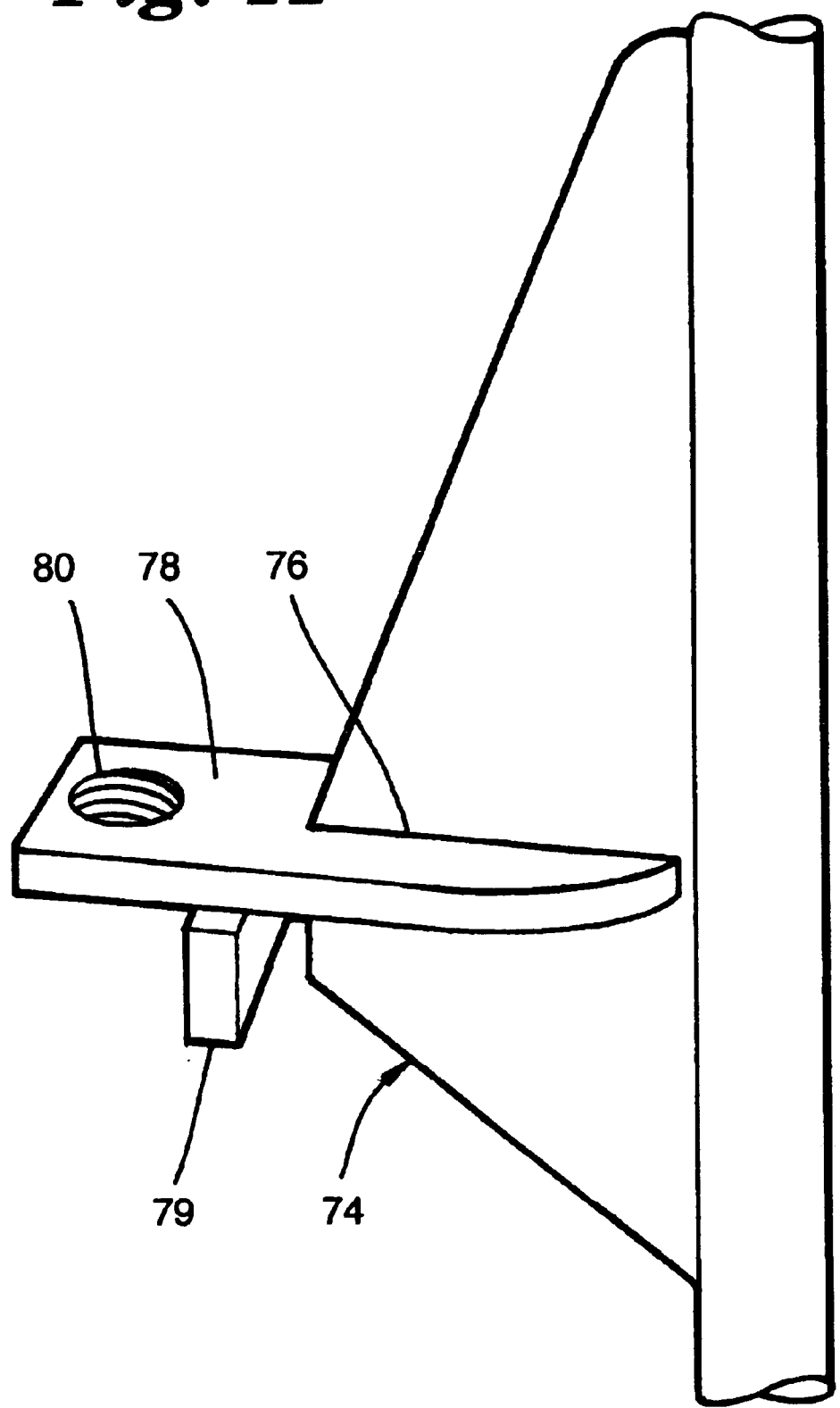
FIG. 12 is a perspective view showing the cradle mounting plate and support flange for the golf club cradle that mounts on the fender mounting bracket by a single bolt.

One embodiment of mounting bracket 30 is shown in FIG. 2. Mounting bracket 30 comprises a flat, chrome-plated plate having openings 32 that mate with openings 20 that already exist in the motorcycle fender. The model of the present invention employed with the Sportster and Dyna models of the Harley Davidson includes a flat, chrome-plated mounting plate 31 that is formed of solid steel and laser cut so as to be 8¾ inches long. The bracket has one 5/16 inch diameter hole at each end used to attach the mounting bracket to existing holes 20 in the vehicle fender. Bolts 34, shown in FIG. 11 are used for this purpose. The bolts are 5/16 inches in diameter and 1¾ inches long. 3½ inches from the front end of the plate is a ¾ inch hole, weld a mounting block 38 having an inwardly threaded opening 40 to the mounting plate. The opening in the mounting block is vertically oriented. The mounting block is a 1 inch cube having a ⅝–11 tapped and threaded hole through the non-cut surface end. The mounting block is welded on the mounting plate with the ⅝ inch hole oriented in a vertical direction and angled upwardly approximately 1/16 of an inch. This is to make sure that the rack is attached to the mount in a vertical position when on the bike. Finally, at the left side or rear side is a 11/16 long upwardly extending recess 42. This allows the bracket to fit over the tail light and fasten to the bike.

A similar bracket 44 is employed for the Softail model of the Harley Davidson motorcycle. Bracket 44 comprises an elongated mounting plate 46 formed of solid steel laser cut plate 11⅛ inches long. Plate 46 has one ⅜ inch hole 48 and a slot 50 ⅞ inches long and ⅜ inches wide in the opposite end of the bracket mounting plate. The hole and slot are used to attach the mount to the bike using ⅜ by 2 inches bolts. Finally, a ¾ inches hole 52 is formed 3⅝ inches from the front end of the mounting plate for mounting a mounting block 38 of the same type used for bracket 30. The block is welded on the mounting plate with the opening 40 therein in a substantially vertical position, but being angled up from the rear to the front of the bike 1/16 of an inch in order to make sure that the rack is vertical when on the bike.

The construction of the cradle 28 is shown in FIGS. 3 and 11. Cradle 28 includes three elongated chrome plated tubes 54, 56, and 58, with tube 58 being positioned between tubes 54 and 56 and with the tubes being oriented in a semi-circular cross sectional configuration. Semi-circular straps 60, 62, and 64 at the top, middle, and bottom of the cradle hold the rods in a semi-circular configuration. A base 66 formed of a plastic or composite material or metal is attached to the bottom of the rods and forms a base for supporting the golf clubs. Straps 68 and 70 at the lower and upper portions of the cradle extend between rods 54 and 56 and hold golf bag 72 (shown in phantom in FIG. 3) in the rack.

The manner in which the cradle is mounted on the mounting bracket is shown in FIG. 3. A mounting flange 74 extends forwardly from an intermediate position where it is welded on center rod or tube 58. A slot 76 in the mounting flange accommodates a horizontal mounting plate 78 that is welded to the mounting flange and extends forwardly therefrom. An opening 80 in the forward end of mounting plate 78 mates with opening 40 in mounting block 38 when the cradle is mounted on the mounting bracket. Downwardly extending stop plate 79 abuts the outer surface of block 38. A bolt 82 extends downwardly through the mounting plate opening 80 into threaded opening 40 to securely attach the cradle to the side of the motorcycle. Mounting plate is oriented at an angle with respect to the orientation of rods 54, 56, and 58, such that the cradle is inclined inwardly at an angle of about 30 degrees when mounted on the motorcycle. This prevents the clubs from falling out when the motorcycle is operated and turned and also tends to keep the golf clubs in a more centered position over the back of the motorcycle.

An important feature of the present invention is that the mounting bracket is unobtrusive and can be mounted substantially permanently on the motorcycle simply by bolting it to the existing mounting holes in the fender. Thus, the cradle for the golf clubs can be mounted and dismounted from the motorcycle as desired, using the simple, one bolt attachment mechanism.

When it is desired to remove the rack from the motorcycle permanently, the mounting plate can easily be removed by removing bolts 34 and reinstalling the original bolts. Thus, the motorcycle can be restored to its original condition without any modification of the motorcycle.

The foregoing represents exemplary embodiments of the preferred practice of the present invention. However, it should be understood that various changes and modifications may be made in the arrangements and details of construction of the embodiments disclosed herein without departing of the spirit and scope of the invention.

What is claimed is:

1. A golf club rack that is adapted to be mounted on a motorcycle rear fender through existing spaced fender holes in the upper side of the motorcycle fender, comprising:

a mounting plate having spaced mounting holes therein that mate with the existing fender holes in the motorcycle;

releasable fasteners for removably mounting the mounting plate on the motorcycle fender, the releasable fasteners extending through the mating spaced mounting holes in the mounting plate and fender and attaching the mounting plate securely to the motorcycle fender;

a mounting block mounted on the mounting plate, the mounting block extending outwardly from the mounting plate and having a mounting hole extending downwardly in the mounting block;

a cradle for carrying golf clubs or other elongated cargo, the cradle having a bottom and upwardly extending sides that enclose at least a part of the sides of the cradle, such that elongated cargo can rest on the bottom and can be constrained in an upward position by the sides;

a mounting bracket on an inner side of the cradle, the mounting bracket having a hole extending downwardly therethrough that can be positioned to mate with the downward opening in the mounting block on the mounting plate; and a cradle fastener that engages the mating openings in the mounting block and mounting bracket to removably secure the cradle to the mounting block on the motorcycle, the cradle being removable by removing the cradle fastener.

2. A golf club rack as in claim 1 wherein the mounting plate has a recess therein that fits over an outwardly extending tail light supporting arm that is mounted on the motorcycle fender.

3. A golf club rack as in claim 1 wherein the mounting bracket is mounted at an inclined angle with respect to the sides of the cradle, such that the cradle is inclined inwardly from bottom to top when mounted on the motorcycle.

4. A golf club rack as in claim 3 wherein the cradle, when mounted on a motorcycle, is inclined inwardly by about 30° with respect to the motorcycle.

5. A golf club rack as in claim 1 wherein the mounting plate is shaped to be mounted on top of and superimposed on an existing fender mounting bracket that is part of the motorcycle and is attached to the fender by spaced mounting holes that mate with the existing spaced holes in the motorcycle fender.

6. A golf club rack as in claim 5 wherein the mounting plate has a recess therein that fits over a mounting arm for an original equipment fender mounted tail light mounting arm on a production motorcycle.

7. A golf club rack as in claim 1 wherein the fasteners for fastening the mounting plate in the existing fender mounting holes, are long enough to be received in the fender mounting holes, such that the fasteners can accommodate the extra thickness of the mounting plate for the golf club rack.

8. A golf club rack as in claim 1 wherein the sides comprise a plurality of spaced longitudinal rods extending upwardly from the periphery of the base of the cradle, the rods being connected together by connecting members at upper positions thereon, the elongated cargo fitting inside the rods and being constrained by the rods and connecting members to remain in an upright position.

9. A golf club rack as in claim 8 wherein the rods are spaced apart at an outer side thereof such that a golf bag can be inserted sideways into the cradle, the cradle further having a releasable retaining strap that can be fastened over mounted cargo between the spaced apart rods in order to hold the mounted cargo in the cradle.

10. A golf club rack as in claim 1 wherein the mounting block hole is threaded such that the cradle can be mounted to the motorcycle by threading a bolt through the hole of the cradle mounting plate and into the threaded hole in the mounting block.

11. In a motorcycle having a rear fender with a bracket secured to the upper side of the rear fender by means of spaced openings in the bracket and fender, the improvement comprising a rack for carrying elongated cargo on the side of the motorcycle, comprising:

a mounting plate having spaced mounting openings that mate with said mating spaced fender and bracket openings;

a mounting block mounted on an outer side of the mounting plate, the mounting block having a downwardly extending cradle opening therein;

fasteners that extend through the mating spaced fender, bracket, and mounting plate openings so as to mount the mounting plate on the fender;

a cradle comprising a bottom and sides extending upwardly from the bottom so as to define an interior compartment for elongated cargo;

a mounting bracket on an inner side of the cradle, the mounting bracket having a downwardly extending mounting opening therein that mates with the cradle opening in the mounting block when the cradle is mounted on the mounting block; and a fastener that extends through the mounting bracket opening and into the cradle mounting opening to secure the cradle to the mounting bracket, the cradle being removable from the mounting bracket by releasing the fastener, the mounting bracket being sufficiently unobtrusive that it can be left permanently in place on the motorcycle without significantly detracting from the appearance of the motorcycle.

* * * * *